US012126458B1

(12) United States Patent
Pillai et al.

(10) Patent No.: US 12,126,458 B1
(45) Date of Patent: Oct. 22, 2024

(54) CORE ALLOCATION AND POWER SAVING FOR MULTI-CORE NETWORK PROCESSING UNITS DEPLOYED IN A SOFTWARE DEFINED WIDE AREA NETWORK

(71) Applicant: Cisco Technology, Inc., San Jose, CA (US)

(72) Inventors: Harikrishnan Pillai, San Jose, CA (US); Ju Lin, San Jose, CA (US); Niels-Peder M. Jensen, Sunnyvale, CA (US); David Michael Prives, San Jose, CA (US); Ping Zhang, Shanghai (CN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/838,356

(22) Filed: Jun. 13, 2022

(51) Int. Cl.
| | |
|---|---|
| *G06F 15/173* | (2006.01) |
| *H04L 12/12* | (2006.01) |
| *H04L 43/0876* | (2022.01) |
| *H04L 43/20* | (2022.01) |
| *H04L 49/60* | (2022.01) |

(52) U.S. Cl.
CPC .......... *H04L 12/12* (2013.01); *H04L 43/0876* (2013.01); *H04L 43/20* (2022.05); *H04L 49/60* (2013.01)

(58) Field of Classification Search
None
See application file for complete search history.

(56) References Cited

U.S. PATENT DOCUMENTS

| | | | | |
|---|---|---|---|---|
| 7,917,625 | B1* | 3/2011 | Cook .................... | G06F 9/5083 370/254 |
| 8,289,968 | B1* | 10/2012 | Zhuang ............... | H04L 61/2532 370/252 |
| 9,170,912 | B1* | 10/2015 | Hu ........................ | G06F 1/3203 |
| 2006/0253717 | A1 | 11/2006 | Fung | |
| 2011/0161683 | A1* | 6/2011 | Zou ....................... | G06F 1/3203 713/300 |
| 2012/0266179 | A1* | 10/2012 | Osborn ................ | G06F 9/5088 718/105 |
| 2014/0254388 | A1 | 9/2014 | Kumar et al. | |
| 2015/0200862 | A1 | 7/2015 | Muniraju | |
| 2015/0293582 | A1* | 10/2015 | Popovic .............. | H04L 41/0806 713/323 |
| 2017/0091108 | A1 | 3/2017 | Arellano et al. | |
| 2018/0129503 | A1* | 5/2018 | Narayan ............ | H03K 19/0175 |
| 2018/0232321 | A1 | 8/2018 | Akyildiz et al. | |
| 2021/0109584 | A1* | 4/2021 | Guim Bernat ........ | H04L 41/147 |
| 2021/0144517 | A1* | 5/2021 | Guim Bernat ........ | H04L 9/0637 |

(Continued)

*Primary Examiner* — Phuoc H Nguyen
(74) *Attorney, Agent, or Firm* — Edell, Shapiro & Finnan, LLC

(57) ABSTRACT

Presented herein are techniques to conserve power by network devices in a software define wide area network (SD-WAN). A method includes monitoring operations of a software defined wide area network including a network device in the software defined wide area network, based on results of the monitoring, generating a usage model for the network device, determining, based on the usage model, a power management scheme for a multi-core network processing unit operating on the network device, and causing the multi-core network processing unit operating on the network device to execute the power management scheme.

20 Claims, 5 Drawing Sheets

(56) References Cited

U.S. PATENT DOCUMENTS

| | | |
|---|---|---|
| 2022/0011852 A1 | 1/2022 | Udhayan et al. |
| 2022/0366494 A1* | 11/2022 | Cella ................. G06Q 30/0201 |
| 2022/0374288 A1* | 11/2022 | Kibardin ................. G06N 3/04 |
| 2022/0382903 A1* | 12/2022 | Herman ............... G06F 21/6245 |
| 2023/0012609 A1* | 1/2023 | Wang ...................... H04L 43/10 |
| 2023/0205606 A1* | 6/2023 | Palermo ................ G06F 9/5094 |
| | | 718/104 |

* cited by examiner

CORE ALLOCATION AND POWER SAVING FOR MULTI-CORE NETWORK PROCESSING UNITS DEPLOYED IN A SOFTWARE DEFINED WIDE AREA NETWORK

TECHNICAL FIELD

The present disclosure relates to configuring and controlling multi-core network processing units (NPUs), such as routers, in a software-defined wire area network (SDWAN) environment.

BACKGROUND

SDWAN platforms based on multi-core network processing units (NPUs) including, e.g., routers, use an allocation of NPU cores and resources based on licensing to achieve maximum performance or scale for data plane processing or service plane processing, or a combination of such processing. A licensing-based core allocation is employed to guarantee a given behavior, scale, or performance during expected levels of operations based on customer configuration, or a set of software licenses the customer may have purchased. In times of high utilization, this licensing-based core allocation approach ensures that there is little to no latency experienced when a given core transitions from a sleep operation state to an awake, or normal, operation state.

A downside to this fixed approach, however, is that, for example, at many sites, "normal" operation is really only needed for a limited and/or fixed duration of time. That is, there may, in fact, be long periods of time where given data plane dedicated cores or service plane dedicated cores may be mostly static, yet those cores still consume power by virtue of being actively enabled. Likewise, associated dynamic random access memory (DRAM), static random access memory (SRAM), and other related hardware resources are kept active to support worst case traffic profiles, such that even more power is needlessly consumed.

DESCRIPTION OF EXAMPLE EMBODIMENTS

Overview

Presented herein are techniques to conserve power by network devices in a software define wide area network (SDWAN). A method includes monitoring operations of a software defined wide area network including a network device in the software defined wide area network, based on results of the monitoring, generating a usage model for the network device, determining, based on the usage model, a power management scheme for a multi-core network processing unit operating on the network device, and causing the multi-core network processing unit operating on the network device to execute the power management scheme.

In another embodiment, a device is provided. The device includes an interface configured to enable network communications, a memory, and one or more processors coupled to the interface and the memory, and configured to: monitor operations of a software defined wide area network including a network device in the software defined wide area network to obtain monitor results, based on the monitor results, generate a usage model for the network device, determine, based on the usage model, a power management scheme for a multi-core network processing unit operating on the network device, and cause the multi-core network processing unit operating on the network device to execute the power management scheme.

EXAMPLE EMBODIMENTS

In an effort to conserve power, embodiments described herein operate in connection with network devices that employ multi-core network processing units (NPUs) and that are deployed in a SDWAN environment. The embodiments analyze, network-wide and in a holistic way, traffic profiles for the network devices and predict a usage model for respective network devices, and then leverage the usage model to dynamically adjust power management configurations of the multi-core NPUs.

Figure 1:
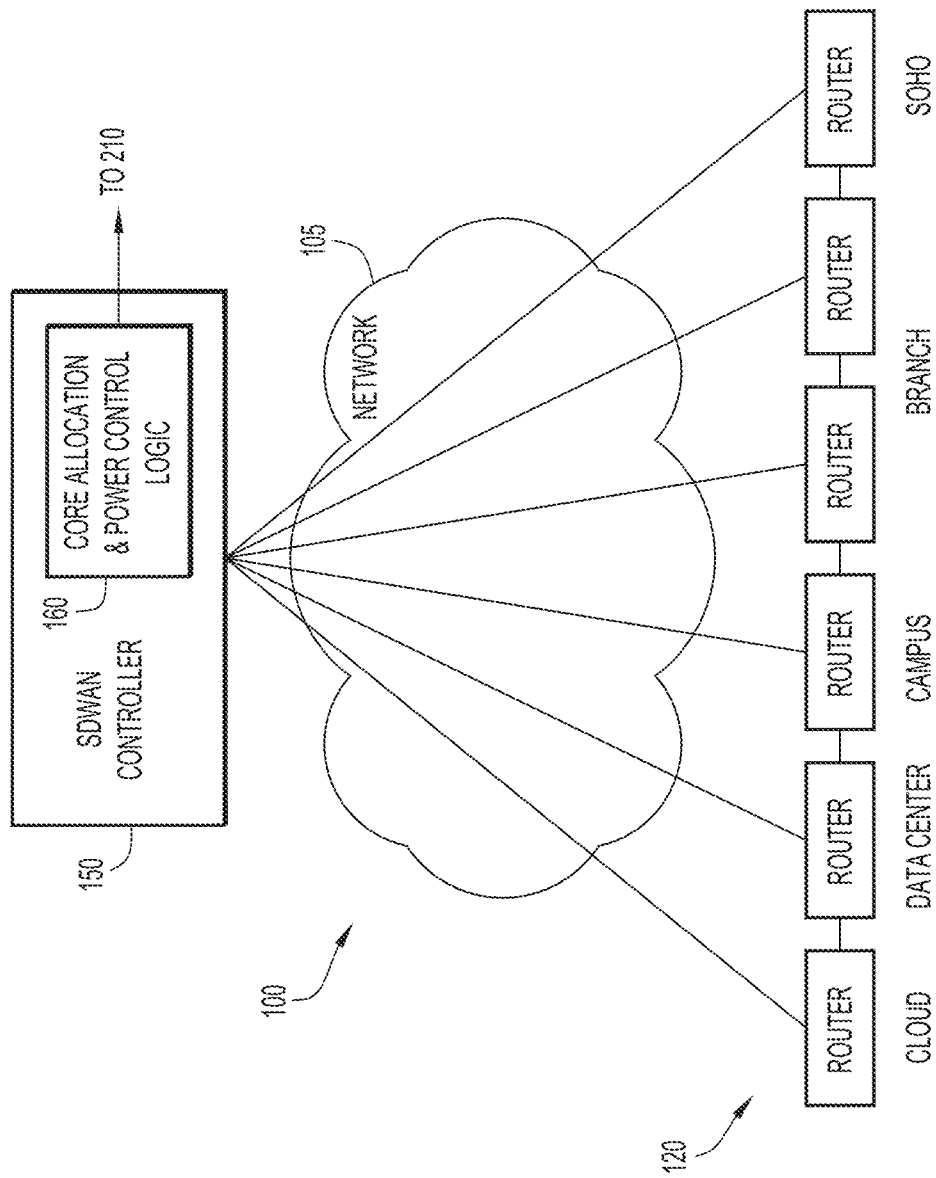
FIG. 1 shows an SDWAN including a plurality of network devices that employ multi-core network processing units (NPUs), and an SDWAN controller that hosts core allocation and power control logic, according to an example embodiment.

FIG. 1 shows a SDWAN 100 including a plurality of network devices 120, wherein at least some of the network devices 120 employ at least one multi-core NPU 200 (see FIG. 2), and a SDWAN controller 150 that hosts core allocation and power control logic 160, according to an example embodiment. Network devices 120 may be in communication with one another and with SDWAN controller 150 via a network 105, which may include a public network (e.g., the Internet) or a private network. Network devices 120 may include routers, or the like, deployed at an edge of a given network, or deployed internally to a given network. In the case of FIG. 1, network devices 120 may be deployed on behalf of, or at, a single office/home office (SOHO), a branch office, a campus, a data center, and/or cloud deployment. SDWAN controller 150 is configured to manage each of the network devices 120 to establish appropriate network connectivity and quality of service on behalf of customers or clients that have computing nodes (not shown) connected to respective network devices 120.

Typically, a device in an SDWAN operates independently with regard to any form of power saving or power management schemes. That is, a given device may not have any hardware-related or system-on-chip (SoC) managed power management capabilities because these devices have no awareness of overall network traffic and may have significant latencies involved in transitioning from sleep states, thus affecting the performance profile of the given device during normal operation.

To address this myopic view power management, and in an effort to provide improved control over power consumption, SDWAN controller 150, as shown in FIG. 1, also includes core allocation and power control logic 160. Those skilled in the art will appreciate that core allocation and power control logic 160 could be hosted elsewhere, and have connectivity to SDWAN controller 150. As will be explained in detail below, core allocation and power control logic 160 is configured to analyze relevant network/traffic information from network devices 120, as well as information from, possibly, alternative sources, and is further configured to create or establish a usage model for the network devices 120 that may then be used to dictate how individual cores in each multi-core NPU 200 should be allocated, and how each such multi-core NPU 200 should be operated to help save power, including slowing down (via clock frequency throttling) selected cores or putting selected cores into a sleep mode.

Figure 2:
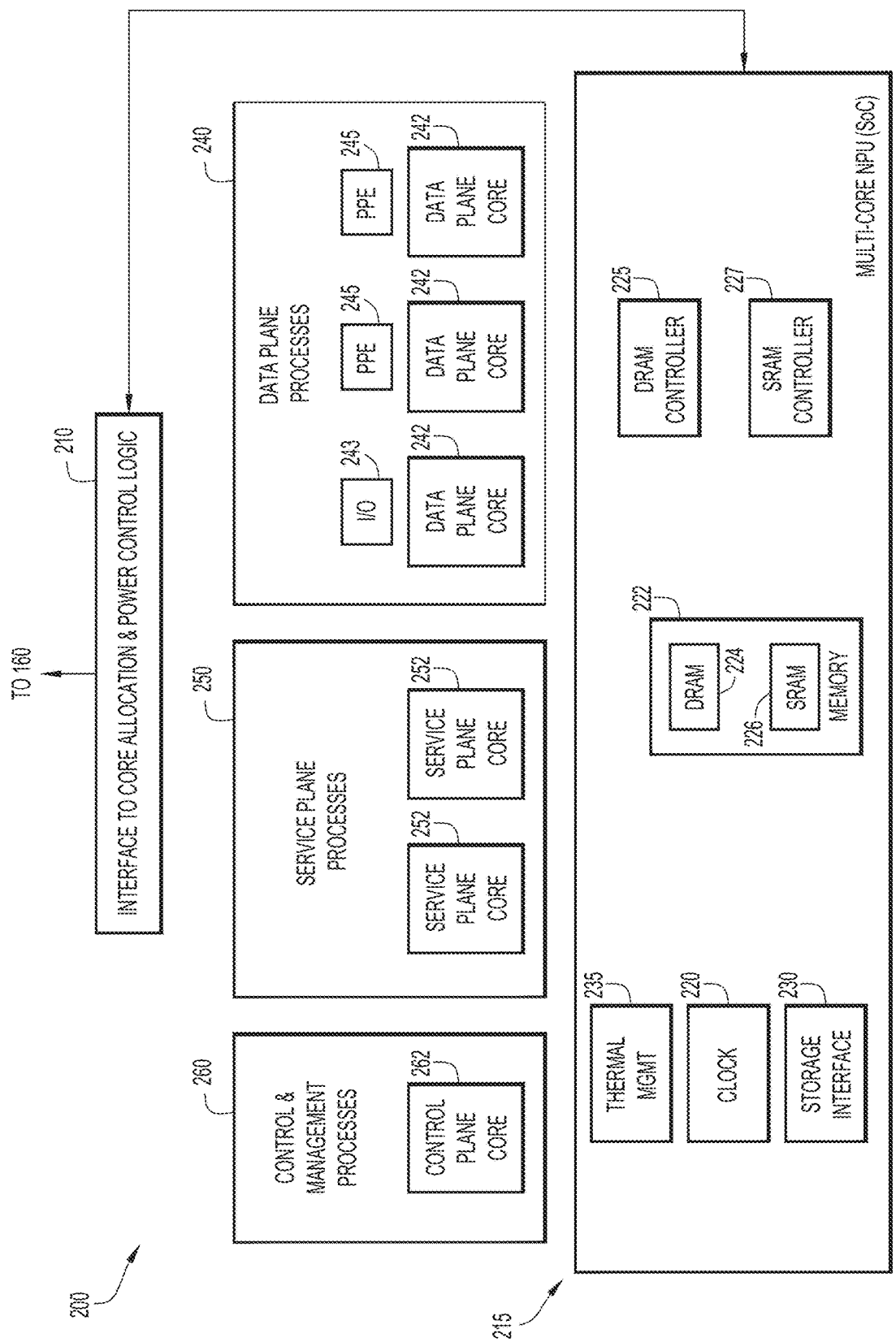
FIG. 2 is a block diagram of a multi-core NPU, including an interface to core allocation and power control logic, which may be hosted by SDWAN controller, according to an example embodiment.

FIG. 2 is a block diagram of multi-core NPU 200, including an interface 210 to core allocation and power control logic 160, which, as noted, may be hosted by SDWAN controller 150, according to an example embodiment. Multi-core NPU 200 may be characterized as a system-on-chip (SoC) and may include, for example, multiple processing cores 215, a clock 220, memory 222 including DRAM 224, SRAM 226, DRAM controller(s) 225, SRAM controller 227, a storage interface 230, and thermal management module 235. Processing cores 215 may be allocated among, e.g., data plane processes 240, service plane processes 250, and control and management processes 260. Data plane processes 240 may include data plane cores 242 that handle input/output (I/O) 243, and packet processing engines 245. Service plane processes may include service plane cores 252, and control and management processes may include control plane core 262.

In an embodiment, due to the relatively lower load on control and management processes 260, a single control plane core 262 may be dedicated to control and management processes 260.

In an embodiment, data plane cores 242 may be used for various purposes, including packet processing engines 245 for main packet processing and forwarding functionality, I/O 243 including receive and transmit functionality, and cryptographic offload decryption and encryption, among others. Different I/O functionalities can share the same core or have dedicated cores.

In an embodiment, service plane cores 252 may manage, among other things, container services.

Embodiments described herein provide an innovative approach for allocation of processing cores 215 and power management by considering network traffic, network analytics, and licensing configurations by customers, to detect, e.g., the least used flows/sessions, develop an appropriate usage model across network 105, and, thus, configure individual platform resources with an optimized routing profile and core allocation for data plane processes 240 and service plane processes 250, and to configure optimized power saving mechanisms.

In an embodiment, core allocation and power saving schemes may be triggered by core allocation and power control logic 160 based on a selected time period, core or network load, a combination thereof, or additional available intelligence. More specifically, core allocation and power control logic 160 may be configured to consider predicted (based on a developed usage model) day/night traffic patterns, or user selectable patterns for sleep or reduced clocking frequency for selected cores. Core allocation and power control logic 160 may further consider core load using performance counters/network load, such that when a given core's load is below a predetermined threshold, core allocation and power control logic 160 may be configured, based on the usage model, to command selected processing cores 215 of multi-core NPU 200 to transition to a sleep mode or to lower or reduce a frequency of a clock signal supplied by clock 220 to reduce overall power consumption. Core allocation and power control logic 160 may also, likewise, be configured to monitor the load each normally operating (i.e., awake) processing core 215 is experiencing, and when the load reaches a predetermined threshold level, to awaken other processing cores 215 currently in a sleep mode, or to increase the frequency of the clock signal being supplied to selected cores to accommodate the traffic load (even if contrary to a given usage model). In an embodiment, core allocation and power control logic 160 may also rely on a combination of time and core/network load to determine how to allocate, initially, processing cores 215 among the processes (i.e., data plane processes 240 and service plane processes 250) running on multi-core NPU 200, and when to place selected processing cores 215 running on multi-core NPU 200 in sleep or wake modes.

In an embodiment, core allocation and power control logic 160 may rely on additional intelligence to learn traffic patterns of respective multi-core NPUs over time, and create a usage model that can then be leveraged to configure core allocation and power management policies. Such additional intelligence may include user policies regarding core allocation for data plane processes 240 and service plane processes 250 for predetermined durations of time, scaling policies, e.g., memory utilization for a set time of the day/week, and/or clock frequency transition for a given multi-core NPU 200.

A usage model to manage power consumption of a given multi-core NPU 200 may also take into account a number of interfaces (wired Ethernet, digital subscriber line (DSL), or wired WAN (WWAN), the location and type of deployment, or customer profile (SOHO, branch, campus, etc.), a number of active mesh IPSEC connections/tunnels active between network devices 120, application(s) being executed, network parameters including latency, jitter, and historical information. Core allocation and power control logic 160 may still further take into account, in connection with developing a usage model, whether a given network device 120 might be down, or is scheduled to be down, which causes, or will cause, traffic to re-route, resulting in unusual network activities, or whether a scheduled event might cause an unusual spike in network activity in the future.

Those skilled in the art will appreciate that the embodiments described herein provide two levels of configuration control via core allocation and power control logic 160. First, core allocation and power control logic 160, based on a usage model created by core allocation and power control logic 160 over time, may allocate processing cores 215 of multi-core NPU 200 to optimize the number of processing cores 215 operating in connection with data plane processes 240, service plane processes 250, and control and management processes 260. Second, and over the course of a given period of time, core allocation and power control logic 160 may be configured to send power saving commands to individual multi-core NPUs 200 to effect power saving schemes, including putting selected processing cores 215 into sleep mode, and/or reducing the frequency of a clock signal supplied to selected processing cores 215.

Once, based on a usage model, core allocation and power control logic 160 determines that traffic, or timing, or a combination thereof, suggests to implement a power saving scheme, a given multi-core NPU 200 (such as a router) may be configured to copy the least active routes and sessions to high performance storage such NVDIMM (non-volatile dual in-line memory module) or NVME (non-volatile memory express). Which routes and session(s) to copy may be determined by a least used active table algorithm. Also, static configurations may be pushed by SDWAN controller 150. For example, SDWAN controller 150 can send down a configuration (i.e., a file) to devices with a remote procedure call (RPC). The policy file itself can be in xml format which defines each CPU core's function (CP/DP/SP), it's running frequency; fan's speed, etc.

Core allocation and power control logic 160 may also command multi-core NPU 200 to disable or activate DRAM channels, via DRAM controller 225, and resource memory as appropriate in an effort to conserve power.

Core allocation and power control logic 160 may further limit internal core clock frequency and internal fabric frequency to operate in low power modes. This can be performed on all cores, or only on selected data plane cores 242 or service plane cores 252.

As noted, core allocation and power control logic 160 may also perform core allocation among the processing cores 215. Several rules may be applied in connection with core allocation, including ensuring that at least one processing core 215 is allocated to control and management processes 260 and service plane processes 250, and, e.g., at least three processing cores 215 are allocated to data plane processes 240. Those skilled in the art will appreciate that other allocations are possible.

Core allocation and power control logic 160 may be configured to select which processing cores 215 among data plane cores 242 and service plane cores 252 should be powered on/off, or frequency gated, in view of instantaneous or predicted network or core load, or the usage model. Core selection may be performed in a round robin or other deterministic or random way.

In an embodiment, when core allocation and power control logic 160 is operating in accordance with a time-based usage model configuration (e.g., time of day), a given multi-core NPU 200 may power up in a low power mode, consistent with the reboot time (i.e., a low power period of the day/usage model). If core allocation and power control logic 160 is operating in accordance with a load-based usage model configuration, a given multi-core NPU 200 may power up in a full power mode to ensure full functionality when first powered on.

When the usage model indicates transitioning to an active, awake, or normal power state, core allocation and power control logic 160 may also be configured to cause a given multi-core NPU 200 to reactivate resource memory and DRAM channels, via, e.g., DRAM controller 225), copy a last active session back to memory pools, bring up all or more data plane cores 242 and service plane cores 252, and disable any local power management functions.

In addition to controlling the power on/off states of processing cores 215 and clocking frequency of processing cores 215, core allocation and power control logic 160 may also control thermal processes via thermal management module 235. Specifically, along with commands to power off or place selected processing cores 215 into a sleep mode, or to operate with a reduce clock speed, core allocation and power control logic 160 may also command a given multi-core NPU 200 to reduce its cooling fan speed (i.e., revolution per minute (RPM)) to save still more power. For example, reducing a fan's RPM from, e.g., 60-70% (of a maximum) to 30% (of the maximum) in a reduced power mode, can save 12-15 W of power in a typical router.

Thus, core allocation and power control logic 160 may be configured to provide a mechanism to dynamically assign processing cores to different functions (e.g., data plane processes 240, service plane processes 250, and control and management processes 260) based on power savings during predetermined periods of a day, or time slots, and/or based on system load to achieve power savings without power cycling. These mechanisms include power gating selected processing cores 215 and selected memory resources (DRAM 224, SRAM 226) during that time, after saving network information to appropriate storage.

Core allocation and power control logic 160 may also maintain a database, in connection with developing and updating a usage model, of power versus scale and performance that is updated over time or using static configurations. In this way, the usage model can be updated and refined over time.

Figure 3:
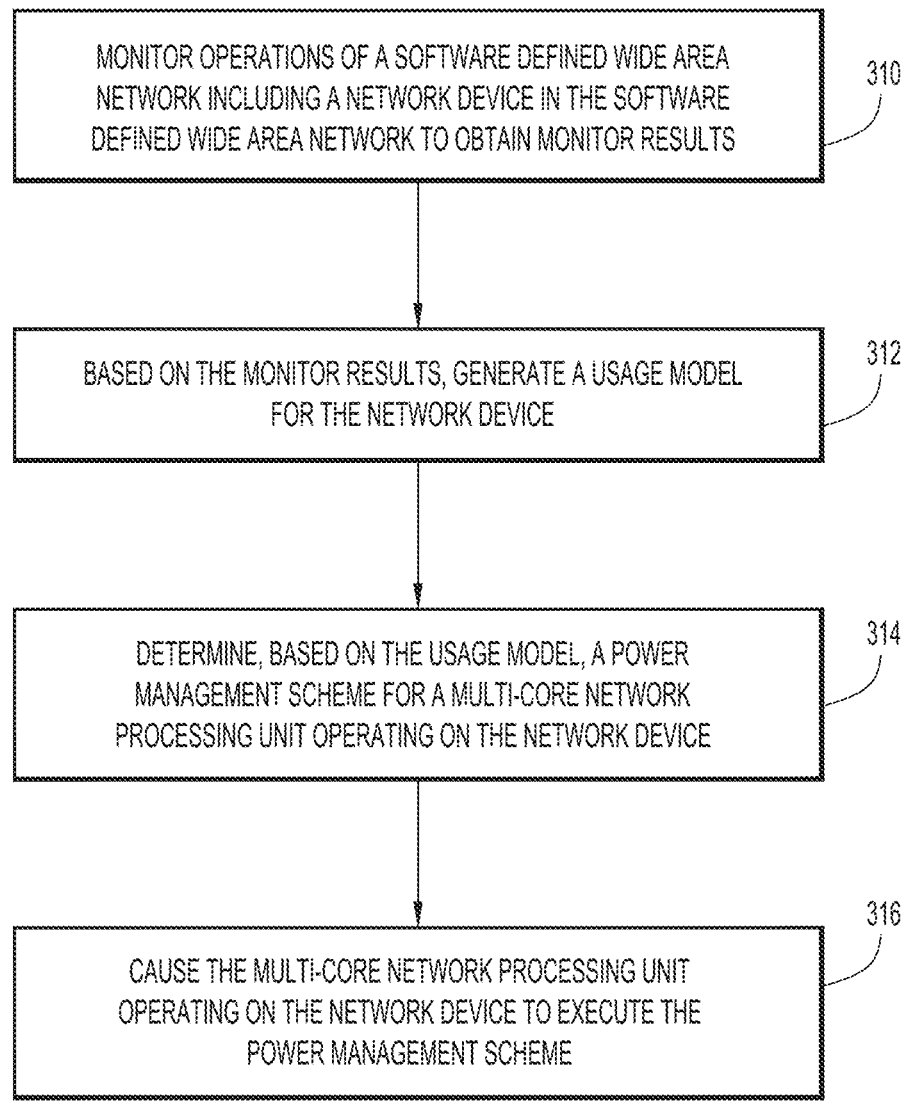
FIG. 3 shows a series of operations that may be executed by core allocation and power control logic, according to an example embodiment.

FIG. 3 shows a series of operations executed by core allocation and power control logic 160, according to an example embodiment. At 310, an operation is configured to monitor operations of a software defined wide area network including a network device in the software defined wide area network to obtain monitor results. At 312, an operation is configured to, based on the monitor results, generate a usage model for the network device. At 314, an operation is configured to determine, based on the usage model, a power management scheme for a multi-core network processing unit operating on the network device. And, at 316, an operation is configured to cause the multi-core network processing unit operating on the network device to execute the power management scheme.

Figure 4:
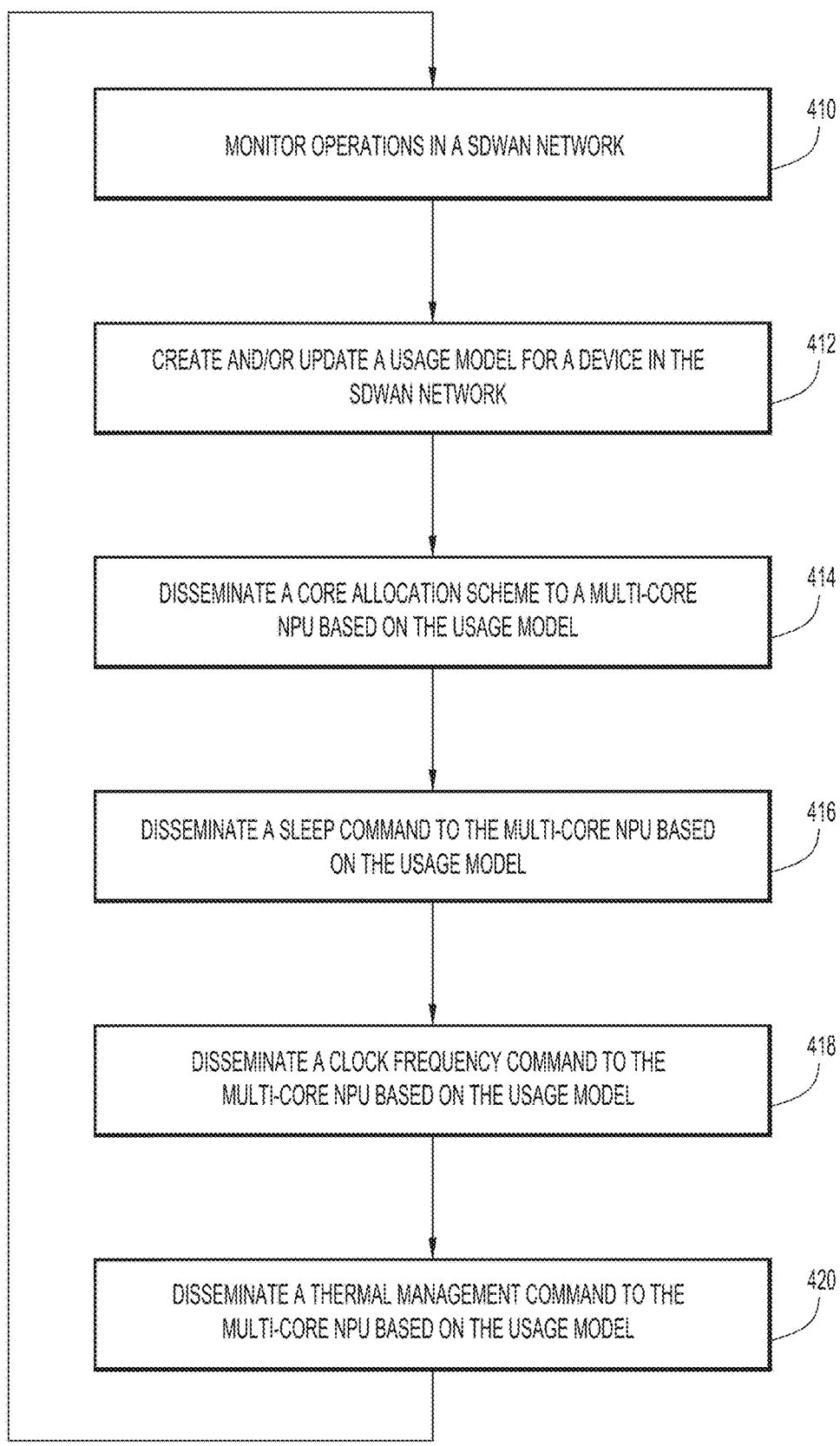
FIG. 4 shows another series of operations that may be executed by core allocation and power control logic, according to an example embodiment.

FIG. 4 shows another series of operations that may be executed by core allocation and power control logic 160, according to an example embodiment. At 410, an operation is configured to monitor operations in an SDWAN network. At 412, an operation is configured to create and/or update a usage model for a device in the SDWAN network. At 414, an operation is configured to disseminate a core allocation scheme to a multi-core NPU based on the usage model. At 416, an operation is configured to disseminate a sleep command to the multi-core NPU based on the usage model. At 418, an operation is configured to disseminate a clock frequency command to the multi-core NPU based on the usage model. At 420, an operation is configured to disseminate a thermal management command to the multi-core NPU based on the usage model. The process may return periodically to 410.

Figure 5:
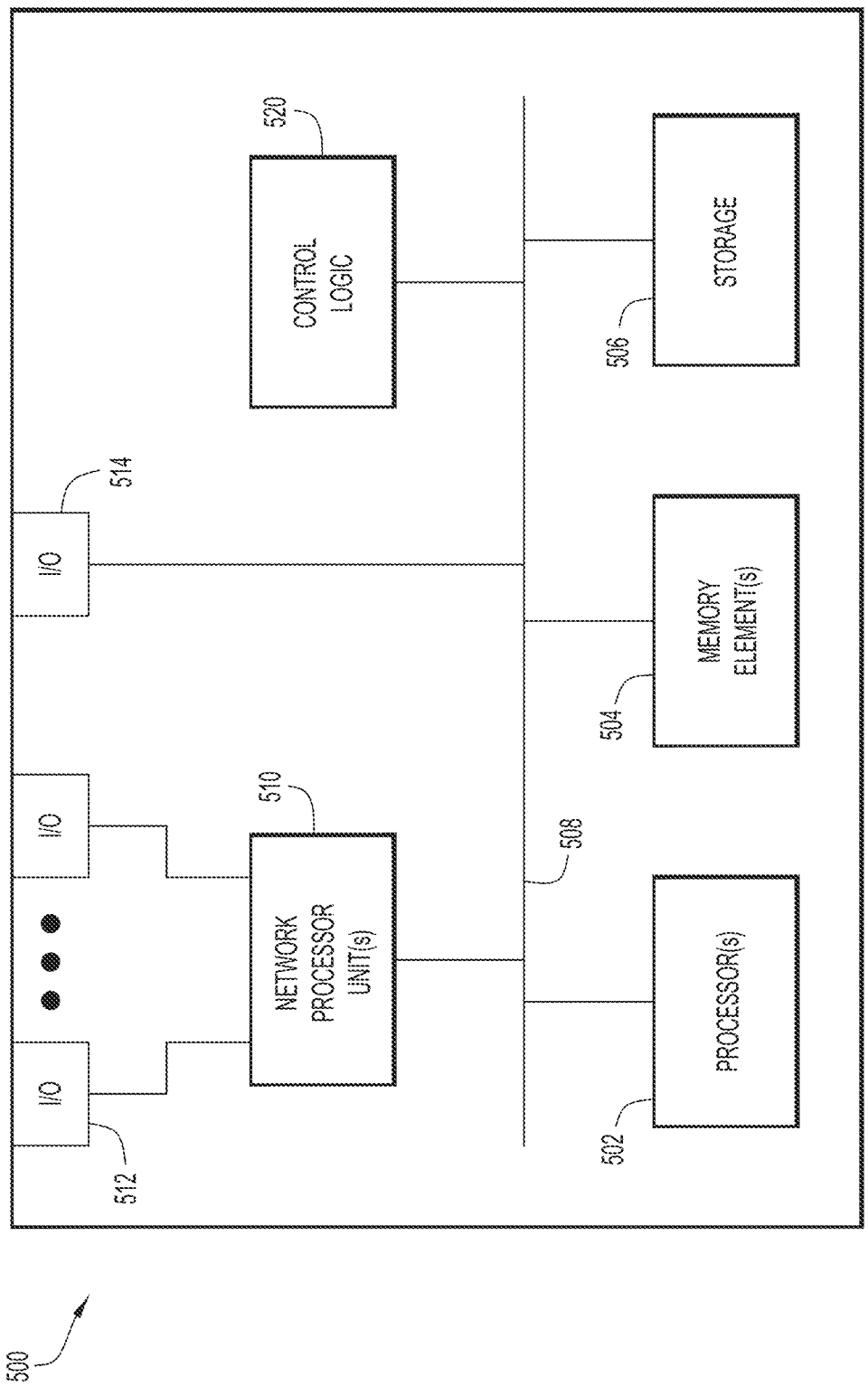
FIG. 5 is a block diagram of a device that may be configured as, e.g., a SDWAN controller that may host core allocation and power control logic, and perform the techniques described herein, according to an example embodiment.

FIG. 5 illustrates a hardware block diagram of a computing device 500 that may perform functions associated with operations discussed herein in connection with the techniques depicted in FIGS. 1-4. In various embodiments, a computing device, such as computing device 500 or any combination of computing devices 500, may be configured as any entity/entities as discussed for the techniques depicted in connection with FIGS. 1-4 in order to perform operations of the various techniques discussed herein.

In at least one embodiment, the computing device 500 may include one or more processor(s) 502, one or more memory element(s) 504, storage 506, a bus 508, one or more network processor unit(s) 510 interconnected with one or more network input/output (I/O) interface(s) 512, one or more I/O interface(s) 514, and control logic 520 (which could include, for example, core allocation and power logic 160). In various embodiments, instructions associated with logic for computing device 500 can overlap in any manner and are not limited to the specific allocation of instructions and/or operations described herein.

In at least one embodiment, processor(s) 502 is/are at least one hardware processor configured to execute various tasks, operations and/or functions for computing device 500 as described herein according to software and/or instructions configured for computing device 500. Processor(s) 502 (e.g., a hardware processor) can execute any type of instructions associated with data to achieve the operations detailed herein. In one example, processor(s) 502 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 504 and/or storage 506 is/are configured to store data, information, software, and/or instructions associated with computing device 500, and/or logic configured for memory element(s) 504 and/or storage 506. For example, any logic described herein (e.g., control logic 520) can, in various embodiments, be stored for computing device 500 using any combination of memory element(s) 504 and/or storage 506. Note that in some embodiments, storage 506 can be consolidated with memory element(s) 504 (or vice versa), or can overlap/exist in any other suitable manner.

In at least one embodiment, bus 508 can be configured as an interface that enables one or more elements of computing device 500 to communicate in order to exchange information and/or data. Bus 508 can be implemented with any architecture designed for passing control, data and/or information between processors, memory elements/storage, peripheral devices, and/or any other hardware and/or software components that may be configured for computing device 500. In at least one embodiment, bus 508 may be implemented as a fast kernel-hosted interconnect, potentially using shared memory between processes (e.g., logic), which can enable efficient communication paths between the processes.

In various embodiments, network processor unit(s) 510 may enable communication between computing device 500 and other systems, entities, etc., via network I/O interface(s) 512 (wired and/or wireless) to facilitate operations discussed for various embodiments described herein. In various embodiments, network processor unit(s) 510 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 500 and other systems, entities, etc. to facilitate operations for various embodiments described herein. In various embodiments, network I/O interface(s) 512 can be configured as one or more Ethernet port(s), Fibre Channel ports, any other I/O port(s), and/or antenna(s)/antenna array(s) now known or hereafter developed. Thus, the network processor unit(s) 510 and/or network I/O interface(s) 512 may include suitable interfaces for receiving, transmitting, and/or otherwise communicating data and/or information in a network environment.

I/O interface(s) 514 allow for input and output of data and/or information with other entities that may be connected to computing device 500. For example, I/O interface(s) 514 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 520 can include instructions that, when executed, cause processor(s) 502 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 520) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 504 and/or storage 506 can store data, software, code, instructions (e.g., processor instructions), logic, parameters, combinations thereof, and/or the like used for operations described herein. This includes memory element(s) 504 and/or storage 506 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In sum, in one embodiment a method is provided. The method may include monitoring operations of a software defined wide area network including a network device in the software defined wide area network, based on results of the monitoring, generating a usage model for the network device, determining, based on the usage model, a power management scheme for a multi-core network processing unit operating on the network device, and causing the multi-core network processing unit operating on the network device to execute the power management scheme.

The method may further include allocating, based on the usage model, processing cores of the multi-core network processing unit to selected processes.

In the method, the selected processes may include at least one of data plane processes, service plane processes, and control and management processes.

In the method, the power management scheme may include placing at least one processing core of the multi-core network processing unit into a sleep state.

In the method, the power management scheme may include reducing a clock frequency supplied to at least one processing core of the multi-core network processing unit.

In the method, the power management scheme may include reducing a fan speed of a cooling fan.

In the method, monitoring operations of the software defined wide area network may include monitoring for future scheduled events.

In the method, monitoring operations of the software defined wide area network may include monitoring a load on the multi-core network processing unit.

The method may be performed by a software defined wide area network controller.

In the method, the usage model may be based on at least one of time of day and load.

A device may also be provided. The device may include an interface configured to enable network communications, a memory, and one or more processors coupled to the interface and the memory, and configured to: monitor operations of a software defined wide area network including a network device in the software defined wide area network to obtain monitor results, based on the monitor results, generate a usage model for the network device, determine, based on the usage model, a power management scheme for a multi-core network processing unit operating on the network device, and cause the multi-core network processing unit operating on the network device to execute the power management scheme.

In the device, the one or more processors may be further configured to: allocate, based on the usage model, processing cores of the multi-core network processing unit to selected processes.

In the device, the selected processes may include at least one of data plane processes, service plane processes, and control and management processes.

In the device, the power management scheme may include placing at least one processing core of the multi-core network processing unit into a sleep state.

In the device, the power management scheme may include reducing a clock frequency supplied to at least one processing core of the multi-core network processing unit.

In the device, the power management scheme may include reducing a fan speed of a cooling fan.

In the device, the one or more processors may be further configured to monitor the operations of the software defined wide area by monitoring for future scheduled events.

In yet another embodiment, one or more non-transitory computer readable storage media encoded with instructions are provided that, when executed by a processor, cause the processor to: monitor operations of a software defined wide area network including a network device in the software defined wide area network to obtain monitor results, based on monitor results, generate a usage model for the network device, determine, based on the usage model, a power management scheme for a multi-core network processing unit operating on the network device, and cause the multi-core network processing unit operating on the network device to execute the power management scheme.

The instructions, when executed by a processor, may cause the processor to: allocate, based on the usage model, processing cores of the multi-core network processing unit to selected processes.

The power management scheme may include at least one of placing at least one processing core of the multi-core network processing unit into a sleep state, reducing a clock frequency supplied to at least one processing core of the multi-core network processing unit, and reducing a fan speed of a cooling fan.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    monitoring, using a computer processor, operations of a software defined wide area network including a network device in the software defined wide area network;
    based on results of the monitoring, generating a usage model for the network device;
    determining, based on the usage model, a power management scheme for multiple cores of a multi-core network processing unit operating on the network device; and
    sending at least one command to the multi-core network processing unit to cause the multi-core network processing unit to operate according to the power management scheme, including, without power cycling, dynamically assigning selected ones of the multiple cores of the multi-core network processing unit to respective data plane services and service plane services, and to disable dynamic random access memory (DRAM) channels via a DRAM controller of the multi-core network processing unit.

2. The method of claim 1, wherein the power management scheme comprises placing at least one processing core of the multi-core network processing unit into a sleep state.

3. The method of claim 2, wherein the power management scheme comprises copying at least one of least active routes and sessions to storage.

4. The method of claim 1, wherein the power management scheme comprises reducing a clock frequency supplied to at least one processing core of the multi-core network processing unit.

5. The method of claim 1, wherein the power management scheme comprises reducing a fan speed of a cooling fan.

6. The method of claim 1, wherein monitoring operations of the software defined wide area network comprises monitoring for future scheduled events.

7. The method of claim 1, wherein monitoring operations of the software defined wide area network comprises monitoring a load on the multi-core network processing unit.

8. The method of claim 1, wherein the method is performed by a software defined wide area network controller.

9. The method of claim 1, wherein the usage model is based on at least one of time of day and load.

10. The method of claim 1, wherein the service plane services comprise managing container services.

11. A device comprising:
an interface configured to enable network communications;
a memory; and
one or more processors coupled to the interface and the memory, and configured to:
monitor, with the one or more processors, operations of a software defined wide area network including a network device in the software defined wide area network to obtain monitor results;
based on the monitor results, generate a usage model for the network device;
determine, based on the usage model, a power management scheme for multiple cores of a multi-core network processing unit operating on the network device; and
send at least one command to the multi-core network processing unit to cause the multi-core network processing unit to operate according to the power management scheme, including, without power cycling, dynamically assigning selected ones of the multiple cores of the multi-core network processing unit to respective data plane services and service plane services, and to disable dynamic random access memory (DRAM) channels via a DRAM controller of the multi-core network processing unit.

12. The device of claim 11, wherein the power management scheme comprises placing at least one processing core of the multi-core network processing unit into a sleep state.

13. The device of claim 12, wherein the power management scheme comprises copying at least one of least active routes and sessions to storage.

14. The device of claim 11, wherein the power management scheme comprises reducing a clock frequency supplied to at least one processing core of the multi-core network processing unit.

15. The device of claim 11, wherein the power management scheme comprises reducing a fan speed of a cooling fan.

16. The device of claim 11, wherein the one or more processors are further configured to monitor the operations of the software defined wide area network by monitoring for future scheduled events.

17. The device of claim 11, wherein the service plane services comprise managing container services.

18. One or more non-transitory computer readable storage media encoded with instructions that, when executed by a processor, cause the processor to:
monitor operations of a software defined wide area network including a network device in the software defined wide area network to obtain monitor results;
based on monitor results, generate a usage model for the network device;
determine, based on the usage model, a power management scheme for multiple cores of a multi-core network processing unit operating on the network device; and
send at least one command to the multi-core network processing unit to cause the multi-core network processing unit to operate according to the power management scheme including, without power cycling, dynamically assigning selected ones of the multiple cores of the multi-core network processing unit to respective data plane services and service plane services, and to disable dynamic random access memory (DRAM) channels via a DRAM controller of the multi-core network processing unit.

19. The one or more non-transitory computer readable storage media of claim 18, wherein the power management scheme comprises at least one of placing at least one processing core of the multi-core network processing unit into a sleep state, reducing a clock frequency supplied to at least one processing core of the multi-core network processing unit, and reducing a fan speed of a cooling fan.

20. The one or more non-transitory computer readable storage media of claim 19, wherein the power management scheme comprises copying at least one of least active routes and sessions to storage.

* * * * *